(12) United States Patent
Senger

(10) Patent No.: US 11,959,528 B2
(45) Date of Patent: Apr. 16, 2024

(54) OUTPUT SHAFT OF A VEHICLE

(71) Applicant: Bayerische Motoren Werke Aktiengesellschaft, Munich (DE)

(72) Inventor: Linda Senger, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 683 days.

(21) Appl. No.: 17/251,654

(22) PCT Filed: May 13, 2019

(86) PCT No.: PCT/EP2019/062167
§ 371 (c)(1),
(2) Date: Dec. 11, 2020

(87) PCT Pub. No.: WO2019/238325
PCT Pub. Date: Dec. 19, 2019

(65) Prior Publication Data
US 2021/0277977 A1 Sep. 9, 2021

(30) Foreign Application Priority Data

Jun. 12, 2018 (DE) .................. 10 2018 209 356.3

(51) Int. Cl.
*F16F 15/167* (2006.01)
*B60K 17/22* (2006.01)
*F16F 15/16* (2006.01)

(52) U.S. Cl.
CPC ............ *F16F 15/167* (2013.01); *B60K 17/22* (2013.01); *F16F 15/161* (2013.01);
(Continued)

(58) Field of Classification Search
CPC .... F16F 15/167; F16F 15/161; F16F 2236/08; F16F 2238/026; B60K 17/22; Y10S 464/905; Y10S 180/905
(Continued)

(56) References Cited

U.S. PATENT DOCUMENTS 3,848,694 A 11/1974 Matsui et al.
4,196,786 A * 4/1980 Hornig .................. C07J 53/007
(Continued)

FOREIGN PATENT DOCUMENTS

CN 1070994 A 4/1993
CN 101153637 A 4/2008
(Continued)

OTHER PUBLICATIONS

International Search Report (PCT/ISA/210) issued in PCT Application No. PCT/EP2019/062167 dated Aug. 6, 2019 with English translation (seven (7) pages).
(Continued)

*Primary Examiner* — Greg Binda
(74) *Attorney, Agent, or Firm* — Crowell & Moring LLP

(57) ABSTRACT

A vehicle output shaft includes a torque transmission shaft, a drive-side end which is connected to a differential by way of a differential-side joint, and an output-side end which is connected to a driven wheel of the motor vehicle by way of a wheel-side joint, as well as at least one torsional vibration damper. The torsional vibration damper is arranged in a series circuit between the torque transmission shaft and at least one of the joints.

15 Claims, 1 Drawing Sheet

(52) U.S. Cl.
CPC ..... *F16F 2236/08* (2013.01); *F16F 2238/026* (2013.01); *Y10S 180/905* (2013.01); *Y10S 464/905* (2013.01)

(58) Field of Classification Search
USPC .......................................... 464/68.3; 192/208
See application file for complete search history.

(56) References Cited

U.S. PATENT DOCUMENTS

| | | | |
|---|---|---|---|
| 4,712,663 A | | 12/1987 | Teraoka |
| 4,799,402 A | | 1/1989 | Van Dest |
| 4,906,220 A | * | 3/1990 | Worner ................ F16F 15/163 |
| | | | 192/208 |
| 5,195,930 A | | 3/1993 | Hirano et al. |
| 5,598,911 A | | 2/1997 | Joachim et al. |
| 7,288,043 B2 | * | 10/2007 | Shioiri .................... F16H 9/125 |
| | | | 192/208 |
| 10,023,049 B2 | * | 7/2018 | Nishimura ............. B60K 17/22 |
| 2008/0188316 A1 | | 8/2008 | Takamura et al. |
| 2010/0081510 A1 | | 4/2010 | Reinhart et al. |

FOREIGN PATENT DOCUMENTS

| | | |
|---|---|---|
| CN | 101683820 A | 3/2010 |
| CN | 203892398 U | 10/2014 |
| CN | 104653647 A | 5/2015 |
| CN | 205824033 U | 12/2016 |
| DE | 2301 102 A1 | 7/1973 |
| DE | 40 38 122 A1 | 6/1991 |
| DE | 10 2007 044 887 A1 | 4/2008 |
| DE | 10 2007 021 628 A1 | 11/2008 |
| DE | 10 2009 015 162 A1 | 9/2010 |
| DE | 10 2012 009 942 A1 | 11/2013 |
| DE | 10 2012 217 389 A1 | 6/2014 |
| DE | 10 2016 209 835 A1 | 12/2017 |
| JP | 56-163995 A | 12/1981 |
| JP | 2007-120544 A | 5/2007 |

OTHER PUBLICATIONS

German-language Search Report issued in German Application No. 10 2018 209 356.3 dated Jan. 22, 2019 with partial English translation (13 pages).

Chinese-language Office Action issued in Chinese Application No. 201980039610.3 dated May 27, 2022 with English translation (15 pages).

Chinese-language Office Action issued in Chinese Application No. 201980039610.3 dated Sep. 28, 2022 with English translation (15 pages).

Chinese-language Office Action issued in Chinese Application No. 201980039610.3 dated Dec. 3, 2021 with English translation (16 pages).

* cited by examiner

OUTPUT SHAFT OF A VEHICLE

BACKGROUND AND SUMMARY OF THE INVENTION

The invention relates to an output shaft of a vehicle having a torque transmission shaft, a drive-side end which is connected to a differential by way of a differential-side joint, and an output-side end which is connected to a driven wheel of the motor vehicle by way of a wheel-side joint.

With regard to the prior art, reference is made by way of example to DE 10 2012 217 389 A1.

The output shaft of a vehicle serves for transmitting force between the transmission and a driven wheel, and is part of the drive train. The output shaft transmits the engine torque from the transmission or differential to the wheels. In addition, it has to compensate for all of the angular and length changes originating from rebounding and compression and steering movements.

Conventionally, an output shaft comprises a wheel-side (fixed) joint, a transmission-side (constant-velocity) joint, and a torque transmission shaft (conventionally in the form of a solid metal shaft).

When a vehicle is making a journey, an output shaft is continuously exposed to high loads, and therefore requirements in respect of strength, rigidity and selection of material imposed on such an output shaft are high.

In order for an output shaft not to be too stiff, the latter is conventionally in the form of a comparatively thin solid metal shaft. So that, however, the strength requirement can still be ensured in the case of such a thin shaft, the shaft is processed by complicated and expensive machining methods and uses comparatively expensive materials.

In the case of motor vehicles having a rear drive and a front engine, the torque generated in the engine has to be transmitted over the entire length of the vehicle to the wheels driving the vehicle. For this purpose, for example, the vehicle output shaft is coupled on the drive side via an axial transmission to the cardan shaft, wherein the cardan shaft is assigned with the opposite end to the motor vehicle engine and can itself be an output shaft. The drive train, which consists inter alia of the cardan shaft and the vehicle output shafts, is more complicated and more torsionally flexible in comparison to a front drive vehicle. This leads to the drive train of a motor vehicle having a front engine and rear drive having a tendency for undesirable vibrations, and therefore the vehicle output shaft may have torsional vibration modes. However, undesirable vibrations, in particular torsional vibrations, may occur even in the case of vehicles having a front engine and front drive.

DE 10 2012 217 389 A1 describes a vehicle output shaft having a torsional vibration damper. This torsional vibration damper is rolled back here in the form of a rubber element around the torque transmission shaft. The torque transmission shaft is therefore virtually connected in parallel to the torsional vibration damper. However, due to a required large roll-back length of the torsional vibration damper over the shaft, the output shaft is very solid and large.

It is the object of the invention to present an output shaft of a vehicle, which comprises reliable torsional vibration damping and can nevertheless be produced and designed cost-effectively and with little complexity.

The object is achieved by a vehicle output shaft according to the independent claim. Advantageous developments and refinements are the content of the dependent claims.

The vehicle output shaft (also referred to as output shaft) comprises a torque transmission shaft. This torque transmission shaft is preferably in the form of a solid metal shaft here. Alternatively, the torque transmission shaft may also be tubular.

Furthermore, the output shaft comprises a drive-side end, which is connected to a differential by means of a differential-side joint.

A wheel-side end of the output shaft is connected to a driven wheel of the vehicle via a wheel-side joint.

The joints or at least one of the joints are/is in particular what are referred to as tripod joints. Tripod joints are what are referred to as constant-velocity joints. They transmit the rotational movement uniformly.

Furthermore, in particular driven rear wheels of a rear axle of a motor vehicle are involved. However, the invention is likewise conceivable in the case of driven front wheels of a front axle or in the case of an all-wheel drive of the vehicle.

Furthermore, the output shaft comprises at least one torsional vibration damper, which is preferably at least approximately annular. Alternatively, the torsional vibration damper can also be round or round at least in sections in its cross section. The torsional vibration damper is arranged here in a series connection with one of the joints (i.e. the wheel-side joint and/or the differential-side joint) and the torque transmission shaft. The torsional vibration damper is particularly preferably arranged or interconnected between the torque transmission shaft and one of the joints. Within the context of this invention, such a series connection is a successively occurring vibration flow from the torque transmission shaft to the torsional vibration damper (or the other way around, depending on the arrangement variant). In the prior art, in which a rubber element is rolled back around the torque transmission shaft, the vibrations run simultaneously and uniformly into the torsional vibration damper and into the torque transmission shaft.

Such a torsional vibration damper is preferably interconnected between one of the two joints and the torque transmission shaft. Alternatively, it is also conceivable (depending on the desired damping) for a torsional vibration damper to be arranged in each case between in each case one joint and the torque transmission shaft.

The torsional vibration damper here is preferably arranged at least approximately coaxially as an annular element with respect to the torque transmission shaft. The torsional vibration damper here preferably comprises an inner ring which is located on the inside and is arranged fixedly (i.e. nondisplaceably or nonrotatably) with the torque transmission shaft. The inner ring does not necessarily have to be annular, but rather can also be formed from the solid so as to be at least approximately circular in its cross section (i.e. without an aperture). Alternatively, the inner ring may also be referred to as an inner mass. It is nevertheless referred to below as an inner ring, even if the ring (as can also be seen in the drawings) does not necessarily have to be annular. The inner ring is furthermore preferably surrounded here by an outer ring which is likewise arranged coaxially with respect to the inner ring or with respect to the torque transmission shaft. The outer ring preferably surrounds the inner ring in the circumferential direction thereof.

The same regarding the annularity also applies to the outer ring. The latter also does not necessarily have to be annular and may also be referred to as an outer mass which at least partially surrounds the inner mass.

The outer ring and the inner ring are arranged rotatably with respect to each other. In other words, the inner ring and the outer ring can rotate relative to each other.

Furthermore, it is preferably provided that the inner ring comprises at least two rotationally arranged spiral springs which are supported on the outer ring. The spiral springs are arranged here with their spring longitudinal direction or spring direction preferably in the circumferential direction of the inner ring, and therefore the spiral springs are preferably capable of cushioning torsional vibrations of the torque transmission shaft or the relative rotation of the inner ring with respect to the outer ring.

Furthermore, it is preferably provided that such spiral springs are distributed over the entire circumference of the inner ring. The spiral springs are preferably arranged here rotationally symmetrically over the circumference of the inner ring.

When torque is introduced to the inner ring (by rotation of the torque transmission shaft), the spiral springs permit a relative rotation (at the respectively selected spring rate of the springs) between the inner ring and outer ring.

By means of the series connection of the torsional vibration damper between the differential and the wheel, setting of a defined torsional rigidity of the torque transmission shaft can be omitted and can be taken over directly by the torsional vibration damper. The spiral springs which are used then take on the task of the torque transmission shaft. Consequently, the torque transmission shaft can be manufactured more cost-effectively while having the same mechanical strength. A retrospective, complicated mechanical machining of the torque transmission shaft to increase the strength is thus no longer necessary since the shaft can already be thicker or more solid. This is because the rigidity is no longer set via the cross section of the shaft, but rather can be set by the spiral springs.

Furthermore, it is preferably provided that the torsional vibration damper comprises at least one hydraulic damper element. The damper element permits a (frequency-selective) damping of the torsional vibrations excited by the engine or by the road.

The hydraulic damper element is preferably arranged here in the outer ring of the torsional vibration damper. The outer ring preferably comprises at least one cavity which extends along the circumference of the torsional vibration damper and is filled with damping fluid. The outer ring particularly preferably comprises the same number of cavities as spiral springs.

Each cavity which is filled with damping fluid preferably has at least one constriction, by means of which constriction damping takes place during a relative rotation of the outer ring with respect to the inner ring. During relative rotation of the inner ring with respect to the outer ring, the fluid is pressed through the constriction and thus produces damping which is speed-dependent.

Furthermore, it is preferably provided that the hardness or the spring rate of the spiral spring is set in such a manner that the wall of the cavity or the wall of the constriction of the cavity never strikes against the inner ring supported on the cavity.

In addition to the already mentioned possibility of setting the torsional rigidity of the torque transmission shaft via the spiral spring, the spiral spring additionally serves advantageously as a resetting spring for the hydraulic damper element. By suitable setting of the spring rate of the spiral spring, the cavity thus never comes into abutment (i.e. into contact with the inner ring).

The hydraulic damper element (i.e. preferably the above-described cavity which is filled with hydraulic fluid) is preferably designed here in such a manner that it damps torsional vibrations in a frequency range of 10-15 Hz. In particular, this can prevent or damp a vibration phenomenon referred to in the prior art as "juddering on starting up".

However, this frequency range includes further vibrations which are perceptible or audible for the driver and which the torsional vibration damper is advantageously capable of avoiding.

In a further preferred refinement of the invention, it is provided that the torsional vibration damper is rotationally symmetrical (with respect to the axis of rotation or with respect to the torque transmission shaft) per se (i.e. with its preferred components, such as, for example, the cavity and the spiral spring). This is desirable in particular for a uniform distribution of mass for the purpose of a uniform load and introduction of force of the torque transmission shaft.

In a further advantageous embodiment of the invention, it is furthermore provided that the outer ring of the torsional vibration damper is simultaneously the housing of the joint, between which joint and the torque transmission shaft this torsional vibration damper is arranged. The outer ring of the torsional vibration damper is thus part of the joint or of the joint housing (i.e. either of the wheel-side or of the differential-side joint). A torsional vibration damper which is integrated in the joint is therefore advantageously possible.

Such a vehicle output shaft, in addition to speed-dependent torsional vibration damping, simultaneously permits setting of the torsional rigidity of the output shaft via the torsional vibration damper, and therefore production which is more cost-effective and is less complex.

These and further features apart from being clear from the claims and the description are also clear from the drawings, wherein the individual features can in each case be realized individually or in a plurality in the form of sub-combinations in an embodiment of the invention and can represent advantageous embodiments which are independently patentable and for which protection is claimed here.

The invention will be explained in more detail below with reference to an exemplary embodiment. All of the features described in more detail may be essential here to the invention.

DETAILED DESCRIPTION OF THE DRAWINGS

Figure 1:
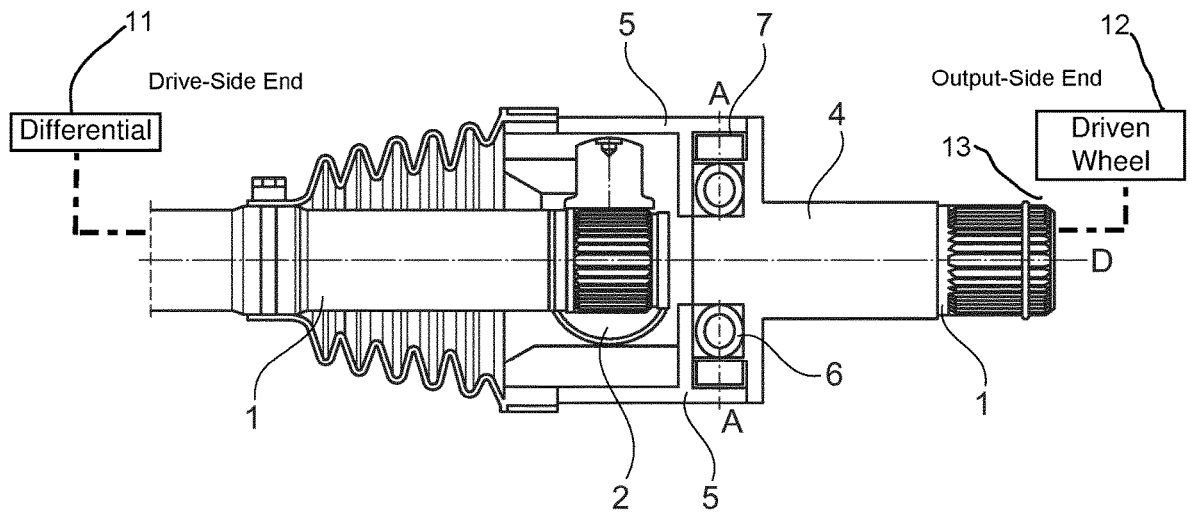
FIG. 1 shows an example of an output shaft according to the invention of a vehicle in a side view of the output shaft.

FIG. 1 depicts part of an output shaft of a vehicle, which output shaft comprises a torque transmission shaft 1. The torque transmission shaft 1 connects a driven vehicle wheel 12 (illustrated generally) to a differential 11 (illustrated generally) by means of a wheel-side joint 13. The differential 11 is connected here to the torque transmission shaft 1 via a differential-side joint 2.

In addition, the output shaft comprises a torsional vibration damper 3, which is arranged as a series connection with the torque transmission shaft 1 and the differential-side joint 2.

Figure 2:
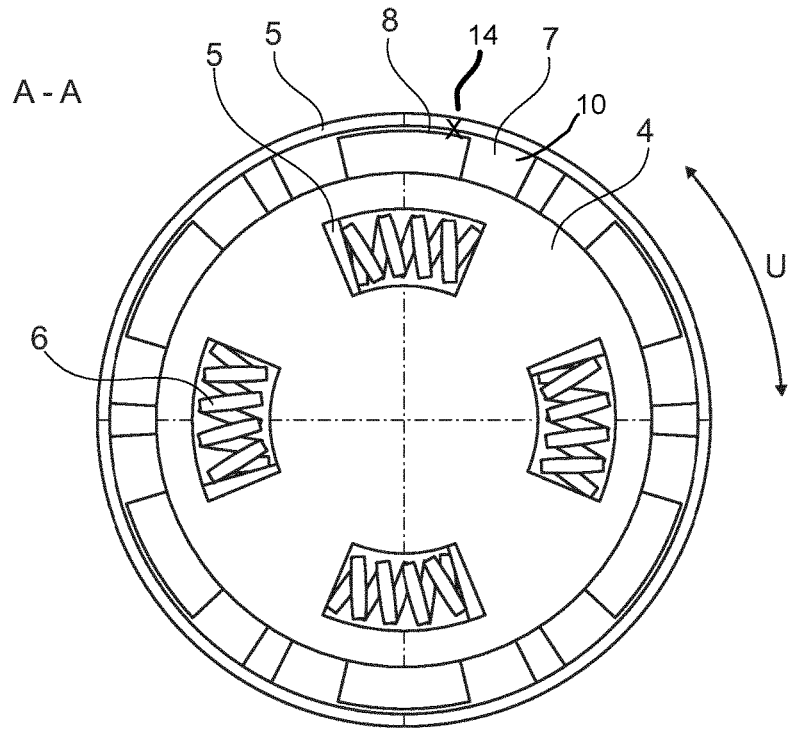
FIG. 2 shows a cross section through an exemplary torsional vibration damper from FIG. 1.

FIG. 2 shows a cross-sectional view A-A through the torsional vibration damper 3. The latter here comprises an inner ring 4 and an outer ring 5 surrounding the inner ring 4. The inner ring 4 is connected here fixedly or for conjoint rotation to the torque transmission shaft 1. The inner ring 4 and the outer ring 5 are connected to each other so as to be rotatable relative to each other about the axis of rotation D of the torque transmission shaft 1. The inner ring 4 here is not necessarily annular, but is formed at least approximately completely in its cross section. The inner ring is nevertheless referred to below as the inner ring 4, even if the inner ring is not annular (as can also be seen in the drawings). The same also applies to the outer ring 5.

Furthermore, the inner ring 4 comprises a plurality of spiral springs 6 arranged in the circumferential direction U of the inner ring 4. The spiral springs, like the rest of the torsional vibration damper 3, are arranged rotationally symmetrically to one another.

During a relative movement between the inner ring 4 and the outer ring 5, the torsional rigidity of the torque transmission shaft 1 is determined by the spring rate of the spiral springs 6. For this purpose, the spiral springs 6 are arranged supported on the outer ring 5. The spaces in the inner ring 4 for the arrangement of the spiral springs 6 interrupt the mentioned completeness of the inner ring 4.

The torsional vibration damper 3 furthermore comprises hydraulic damping. This hydraulic damping is formed by a plurality of cavities 7 which extend along the circumference U of the torsional vibration damper 3 and are filled with hydraulic fluid 10. These cavities 7 are formed by a suitable arrangement of the inner ring 4 with respect to the outer ring 5. In each cavity 7, there is a constriction or a gap 8 through which the hydraulic fluid 10 flows during a relative rotation of the outer ring with respect to the inner ring 4, 5 and thus causes speed-dependent damping. Depending on the size of the gap 8, a different damper rate can thus be set.

It is alternatively also possible for the size of the gap 8 or for the diameter of the gap 8 to be actively changed such that different damper properties depending on the situation can be achieved. For this purpose, a semi-active valve 14 (denoted by an X) or similar is conceivable.

In this case, the size of the gap 8 is selected here in such a manner that torsional vibrations in the range of between 10-15 Hz are damped.

Furthermore, as already mentioned and as can be seen in the two figures, it is preferably provided that the torsional vibration damper 3 is formed rotationally symmetrically per se such that it is not possible for mass non-uniformities to occur in the torque transmission shaft 1.

It is furthermore provided, as can be seen in FIG. 1, that the outer ring 5 of the torsional vibration damper 3 simultaneously constitutes the housing 9 of the differential-side joint 2. A torsional vibration damper 3 of a vehicle output shaft is therefore shown, the torsional vibration damper being integrated in the joint 2 and advantageously having vibration-damping properties and also taking on the torsional rigidity function of the torque transmission shaft 1.

LIST OF REFERENCE SIGNS

1 Torque transmission shaft
2 Differential-side joint
3 Torsional vibration damper
4 Inner ring
5 Outer ring
6 Spiral spring
7 Cavity
8 Gap
9 Housing
10 Hydraulic fluid
11 Differential
12 Driven wheel
13 Wheel-side joint
14 Semi-active valve
A Intersecting axis
D Axis of rotation
U Circumferential direction

What is claimed is:

1. A vehicle output shaft, comprising:
a torque transmission shaft having an axis of rotation;
a drive-side end which is connected to a differential by way of a differential-side joint;
an output-side end which is connected to a driven wheel of a motor vehicle by way of a wheel-side joint; and
at least one torsional vibration damper, the at least one torsional vibration damper comprising an inner ring which is fixedly connected to one end of the torque transmission shaft and coaxial with the axis of rotation, and an outer ring which is formed coaxially around the inner ring and axis of rotation, the inner ring and the outer ring being rotatable relative to each other;
wherein the at least one torsional vibration damper is arranged in a series connection with the torque transmission shaft and with at least one of the differential-side or wheel-side joints; and,
wherein the inner ring comprises at least two spiral springs which are arranged in a circumferential direction relative to the axis of rotation, and are supported on the outer ring.

2. The vehicle output shaft according to claim 1, wherein the at least one torsional vibration damper comprises at least one hydraulic damper element.

3. The vehicle output shaft according to claim 2, wherein the outer ring has at least one cavity which extends along the circumference of the at least one torsional vibration damper, is filled with damping fluid and has at least one constriction, by which constriction damping takes place during a relative rotation of the outer ring with respect to the inner ring.

4. The vehicle output shaft according to claim 3, wherein the constriction comprises a gap, and a size of the gap is selectively.

5. The vehicle output shaft according to claim 3, wherein the number of cavities is equal to the number of spiral springs.

6. The vehicle output shaft according to claim 3, wherein the spiral springs comprise a hardness or spring rate such that a wall of the cavity does not strike against the inner ring.

7. The vehicle output shaft according to claim 1, wherein the at least one torsional vibration damper is formed rotationally symmetrically with respect to the axis of rotation, with a uniform distribution of mass.

8. The vehicle output shaft according to claim 1, wherein the outer ring is part of a housing of the wheel-side and/or of the differential-side joint.

9. A vehicle output shaft, comprising:
a torque transmission shaft having an axis of rotation;
a drive-side end which is connected to a differential by way of a differential-side joint;
an output-side end which is connected to a driven wheel of a motor vehicle by way of a wheel-side joint; and
at least one torsional vibration damper, the at least one torsional vibration damper comprising an inner ring which is fixedly connected to one end of the torque transmission shaft and coaxial with the axis of rotation, and an outer ring which is formed coaxially around the inner ring and the axis of rotation, the inner ring and the outer ring being rotatable relative to each other;

wherein the at least one torsional vibration damper is arranged in a series connection with the torque transmission shaft and with at least one of the differential-side or wheel-side joints; and, wherein the at least one torsional vibration damper comprises at least one hydraulic damper element.

10. The vehicle output shaft according to claim 9, wherein the inner ring comprises at least two spiral springs which are arranged in a circumferential direction relative to the axis of rotation and are supported on the outer ring.

11. The vehicle output shaft according to claim 9, wherein the outer ring has at least one cavity which extends along the circumference of the at least one torsional vibration damper, is filled with damping fluid and has at least one constriction, by which constriction damping takes place during a relative rotation of the outer ring with respect to the inner ring.

12. The vehicle output shaft according to claim 11, wherein the constriction comprises a gap, and a size of the gap is selectively adjustable.

13. The vehicle output shaft according to claim 11, wherein the spiral springs comprise a hardness or spring rate such that a wall of the cavity does not strike against the inner ring.

14. The vehicle output shaft according to claim 9, wherein the at least one torsional vibration damper is formed rotationally symmetrically with respect to the axis of rotation, with a uniform distribution of mass.

15. The vehicle output shaft according to claim 9, wherein the outer ring is part of a housing of the wheel-side and/or of the differential-side joint.

* * * * *